Figure 1:
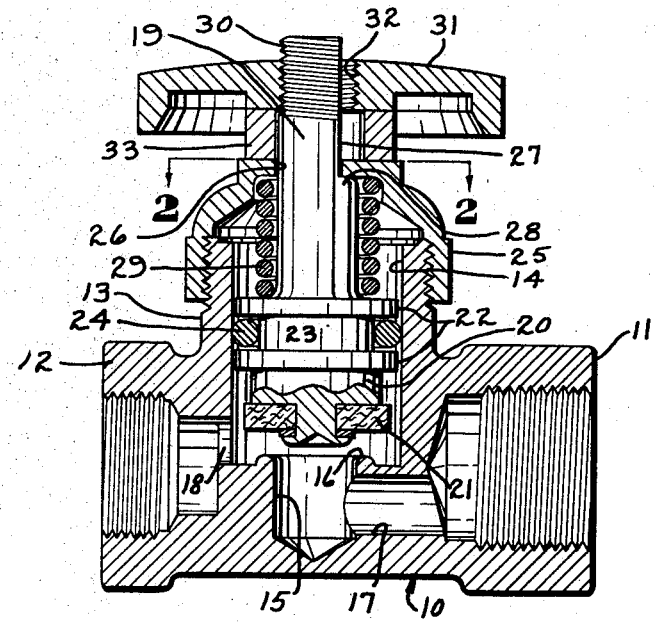

Sept. 8, 1959

D. A. SEAVER 2,903,006

FIRE VALVES

Filed June 7, 1954

INVENTOR
Donald A. Seaver
BY
H. F. Johnston
ATTORNEY

2,903,006
FIRE VALVES

Donald A. Seaver, West Cheshire, Conn., assignor to Scovill Manufacturing Company, Waterbury, N.H., a corporation of Connecticut Application June 7, 1954, Serial No. 434,730

2 Claims. (Cl. 137—77)

This invention relates to improvements in fire valves such as used for connecting oil lines leading to oil burners and the like.

In general the object of my invention is to provide an improved fire valve which is not liable to become stuck or frozen in open or closed position; in which there is minimum danger of leakage; and in which there is a minimum number of parts.

Heretofore in the manufacture of fire valves, it has been customary to provide a leak-proof seal about the stem where it projects through the stem bushing or cap and also another seal where the stem bushing is threaded to the valve body. The stem seal in some cases makes use of a packing compressed in a socket about the valve stem by the valve operating spring which would interfere with the free operation of the stem. In case such packing should dry out, so as to cause a leaky valve, there was no way for reforming the packing unless the valve was entirely disassembled and repacked.

In other structures where a packing gland was employed, it would require two extra parts—a gland sleeve and a nut—to effect a seal about the stem within the stem bushing. The fact that in the old fire valves the seal was made in the valve bushing also required another leak-proof seal at the point where the stem bushing was threaded into the valve body.

One object of this invention is to provide an improved fire valve in which the valve head on the end of the operating stem is provided with a leak-proof seal within a cylindrical chamber in the valve body itself and thus eliminating the double seal that was required in the old type valves.

Another difficulty which has been experienced with valves of this type is that the operating handle or wheel which is threaded to the valve stem would tend to become stuck to the stem so that the stem would rotate with the handle so that the valve could not be closed for shutting off an oil line. According to my invention the valve stem has a non-rotative and freely slidable relationship with the cap. This is possible in my improved construction because no packing is required between the valve stem and cap.

Other objects and advantages of the invention will become apparent during the course of the following description.

Figure 2:
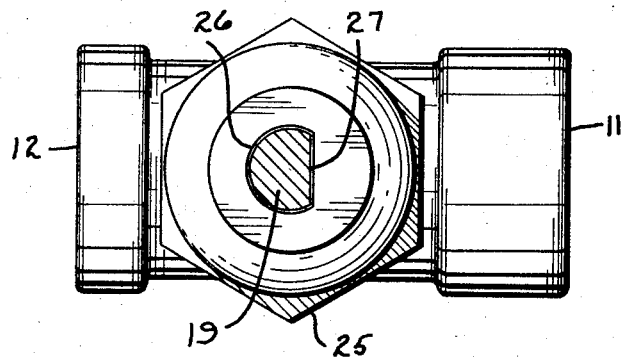

In the drawings:

Fig. 1 is a vertical sectional view of a fire valve embodying my invention and showing the valve in open position, and Fig. 2 is a plan view of the body, but showing the stem in section, the view taken along line 2—2 of Fig. 1.

Referring to the drawing, the numeral 10 designates a valve body having interior threaded ends 11 and 12 to which the usual pipe connections may be made. A screw-threaded extension 13 is formed laterally of the body and surrounds a cylindrical valve chamber 14 that extends halfway into the body 10. A smaller chamber 15 extends further into the body in line with the valve chamber 14 and its upper end is surrounded by a transverse valve seat 16. An inlet port 17 leads from the threaded end 11 into the smaller chamber 15 and an outlet port 18 leads from the chamber 14 to the threaded end 12.

A valve stem 19 is provided with an enlarged head 20 which is movable upwardly and downwardly within the valve chamber 14. A sealing washer 21 is riveted to the end of the stem head 20 and is adapted to engage the valve seat 16 for closing the valve. The stem head 20 is formed with a pair of spaced circumferential flanges 22 providing a circumferential recess 23 within which is fitted an O-ring 24 dimensioned to have a hermetic slidable sealing engagement with the cylindrical wall of the valve chamber 14.

The open end of the valve body extension 13 is closed by a cap 25 having threaded engagement with said extension. The stem 19 extends through an opening 26 in the cap 25 and is formed with a flattened surface 27. From Fig. 2 it will be observed that the opening 26 in the cap is the same shape as that section of the stem 19 having the flat surface 27 so as to prevent relative turning of said stem in the cap 25. Also a shoulder 28 is provided on the stem 19 that abuts against the inner surface of said cap to limit outward movement of said stem. A coil compression spring 29 surrounds the stem 19 with one end abutting the cap 25 and its opposite end abutting the adjacent flange 22 on the stem head 20, said spring normally urging the stem and associated parts inwardly.

The outer end of the stem 19 is threaded at 30 (preferably with a left hand thread) to cooperate with a valve handle 31 having a complemental thread 32. Between the handle 31 and the adjacent face of the cap 25 is disposed a fusible collar 33 surrounding the stem 19.

In the operation of my fire valve, the valve is opened by turning the handle 31 in a left hand direction or closed by turning said handle in a right hand direction, the stem 19 being moved axially against the influence of the spring 29. In case the valve is subjected to sufficient heat, the fusible collar 33 will melt and allow the valve to be automatically closed by the spring 29 so as to shut off the oil line.

It will be noted that by effecting a seal directly between the valve head and the walls of the chamber 14, it is not necessary to provide a seal where the stem passes through the cap 25, nor is it necessary to provide a seal where the cap 25 is threaded onto the body extension 13. Also this particular construction of sealing means serves to guide the stem and valve head concentrically relative to the valve seat in the body to assure that sealing washer 21 will seat properly.

It is, of course, obvious that minor changes in details of construction and arrangement of parts may be made without departing from the scope of the present invention as set forth in the appended claims.

I claim:

1. In a fire valve, a valve body having inlet and outlet connections, a transverse valve seat surrounding an opening which affords communication between said connections, means providing a valve chamber extending in line with said valve seat laterally to one side of the valve body and having a cap threaded thereto, a valve member having a head movable endwise in said valve chamber, a sealing washer on the end of the head adapted to cooperate with said valve seat for closing the valve, a valve stem integral with said valve member extending upwardly through said cap in freely slidable relationship therewith out of any pressure contact with any elements surrounding the stem, means on said cap and stem to prevent relative rotation thereof, means carried by said valve head to effect a slidable seal directly between the valve head and valve body, a compression spring surrounding said valve stem between said cap and valve head, an operating handle having screw threaded connection with that portion of the valve stem which extends beyond said cap, and a fusible collar surrounding the stem between said cap and handle.

2. In a fire valve, the combination defined in claim 1 wherein the valve stem is of round stock and wherein that portion of the valve stem which extends through and beyond the cap has at least one flat surface cooperating with a complemental surface in the cap to prevent relative rotation between the stem and cap, and a shoulder on said stem terminating one end of the flat surface, which shoulder abuts said cap to limit the outward movement of said valve member.

References Cited in the file of this patent

UNITED STATES PATENTS

| | | |
|---|---|---|
| 1,222,758 | Hall | Apr. 17, 1917 |
| 1,834,645 | Ryan | Dec. 1, 1931 |
| 1,964,509 | Fina | June 26, 1934 |
| 2,144,125 | Ryan | Jan. 17, 1939 |
| 2,665,714 | Greenwood | Jan. 12, 1954 |
| 2,778,223 | Kimbrell | Jan. 22, 1957 |

FOREIGN PATENTS

| | | |
|---|---|---|
| 13,029 | Great Britain | July 5, 1895 |